US012762010B2

(12) United States Patent
Salobrena Garcia et al.

(10) Patent No.: US 12,762,010 B2
(45) Date of Patent: Oct. 13, 2026

(54) IMPLICIT STORAGE OF METADATA AT A MEMORY DEVICE

(71) Applicant: Micron Technology, Inc., Boise, ID (US)

(72) Inventors: Casto Salobrena Garcia, Munich (DE); Kevin Gajera, Munich (DE)

(73) Assignee: Micron Technology, Inc., Boise, ID (US)

( * ) Notice: Subject to any disclaimer, the term of this patent is extended or adjusted under 35 U.S.C. 154(b) by 25 days.

(21) Appl. No.: 18/930,772

(22) Filed: Oct. 29, 2024

(65) Prior Publication Data

US 2025/0147840 A1 May 8, 2025

Related U.S. Application Data

(60) Provisional application No. 63/547,088, filed on Nov. 2, 2023.

(51) Int. Cl.
*G06F 11/10* (2006.01)

(52) U.S. Cl.
CPC ................................ *G06F 11/1004* (2013.01)

(58) Field of Classification Search
None
See application file for complete search history.

(56) References Cited

U.S. PATENT DOCUMENTS

| | | | | |
|---|---|---|---|---|
| 6,457,154 | B1 * | 9/2002 | Chen .................. | G06F 11/1016 714/768 |
| 8,694,862 | B2 * | 4/2014 | Sazeides ............. | H03M 13/033 714/766 |
| 8,990,670 | B2 | 3/2015 | Ozdemir et al. | |
| 2018/0067684 | A1 | 3/2018 | Benisty et al. | |
| 2018/0225173 | A1 | 8/2018 | Baek et al. | |
| 2019/0303238 | A1 | 10/2019 | Marietta | |
| 2023/0205627 | A1 | 6/2023 | Sharma et al. | |

OTHER PUBLICATIONS

International Search Report and Written Opinion received for PCT Patent Application No. PCT/US2024/053729, mailed on Feb. 14, 2025, 10 pages.

* cited by examiner

*Primary Examiner* — Guerrier Merant
(74) *Attorney, Agent, or Firm* — Holland & Hart LLP

(57) ABSTRACT

Methods, systems, and devices for implicit storage of metadata at a memory device are described. A memory device may perform an error correction code (ECC) decoding operation on a first set of parity bits for a set of data and a second set of parity bits for the set of data. The memory device may compare the first set of parity bits to the second set of parity bits based on the ECC decoding operation indicating that the set of data has an uncorrectable error, the first set of parity bits to the second set of parity bits. The memory device may recover metadata information, for the set of data, previously received by the memory device, based on the comparison.

25 Claims, 7 Drawing Sheets

IMPLICIT STORAGE OF METADATA AT A MEMORY DEVICE

CROSS REFERENCE

The present Application for Patent claims priority to provisional U.S. Patent Application No. 63/547,088 by Salobrena Garcia et al., entitled "IMPLICIT STORAGE OF METADATA AT A MEMORY DEVICE," filed Nov. 2, 2023, which is assigned to the assignee hereof, and which is expressly incorporated by reference in its entirety herein.

TECHNICAL FIELD

The following relates to one or more systems for memory, including implicit storage of metadata at a memory device.

BACKGROUND

Memory devices are used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored by the memory cell. To store information, a memory device may write (e.g., program, set, assign) states to the memory cells. To access stored information, a memory device may read (e.g., sense, detect, retrieve, determine) states from the memory cells.

DETAILED DESCRIPTION

In some memory systems, a set of data to be stored in a memory device may be accompanied by corresponding metadata information (e.g., information about that set of data) that the memory device may be requested or expected to send to a host device, for example, when the set of data is returned to the host device. To ensure that the metadata information is available to send to the host device, the memory device may store the metadata information (e.g., in dedicated metadata storage) in addition to storing the set of data. But storing metadata information for the set of data, in addition to storing the set of data, may consume excess memory resources and reduce the capacity of the memory device to store other data, among other disadvantages.

According to the techniques described herein, a memory device may encode one or more parity bits for a set of data so that the metadata information associated with the set of data is recoverable by the memory device even though the memory device does not store the metadata information for reading. For example, the memory device may be configured to use the inversion status of a set of stored parity bits for the set of data to represent the metadata information. The memory device may determine the inversion status of the set of stored parity bits—and thus the metadata information—based on the error status for the set of data as determined by an error decoding operation for the set of data. By using the inversion status of parity bits to represent the metadata information for a set of data, the memory device may recover the metadata information without consuming additional memory resources to store the metadata information.

In addition to applicability in systems as described herein, techniques for implicitly storing metadata may be generally implemented to support artificial intelligence applications. As the use of artificial intelligence increases to support machine learning, analytics, decision making, or other related applications, electronic devices that support artificial intelligence applications and processes may be desired. For example, artificial intelligence applications may be associated with accessing relatively large quantities of data for analytical purposes and may benefit from memory systems and/or memory devices capable of effectively and efficiently storing relatively large quantities of data or accessing stored data relatively quickly. Implementing the techniques described herein may support artificial intelligence and/or machine learning techniques by increasing memory capacity for data (because a memory system and/or a memory device can recover metadata information without consuming memory resources), among other benefits.

Features of the disclosure are illustrated and described in the context of systems and architectures. Features of the disclosure are further illustrated and described in the context of process flows and flowcharts.

Figure 1:
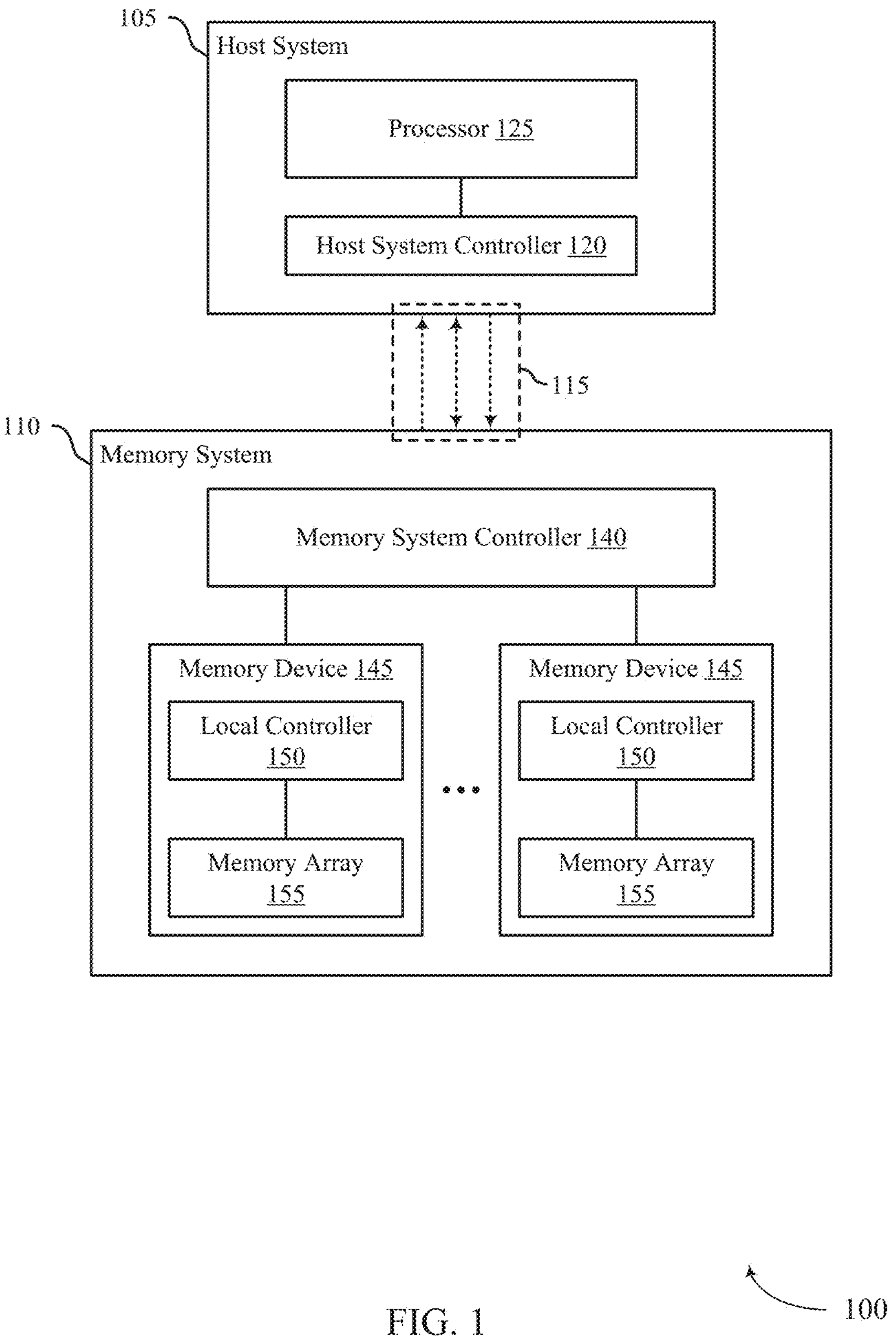
FIG. 1 shows an example of a system that supports implicit storage of metadata at a memory device in accordance with examples as disclosed herein.

FIG. 1 illustrates an example of a system 100 that supports implicit storage of metadata at a memory device in accordance with examples as disclosed herein. The system 100 may include portions of an electronic device, such as a computing device, a mobile computing device, a wireless communications device, a graphics processing device, a vehicle, a smartphone, a wearable device, an internet-connected device, a vehicle controller, a system on a chip (SoC), or other stationary or portable electronic system, among other examples. The system 100 includes a host system 105, a memory system 110, and one or more channels 115 coupling the host system 105 with the memory system 110 (e.g., to support a communicative coupling). The system 100 may include any quantity of one or more memory systems 110 coupled with the host system 105.

The host system 105 may include one or more components (e.g., circuitry, processing circuitry, one or more processing components) that use memory to execute processes, any one or more of which may be referred to as or be included in a processor 125. The processor 125 may include at least one of one or more processing elements that may be co-located or distributed, including a general-purpose processor, a digital signal processor (DSP), an application-specific integrated circuit (ASIC), a field-programmable gate array (FPGA) or other programmable logic device, a controller, discrete gate or transistor logic, one or more discrete hardware components, or a combination thereof. The processor 125 may be an example of a central processing unit (CPU), a graphics processing unit (GPU), a general-purpose GPU (GPGPU), or an SoC or a component thereof, among other examples.

The host system 105 may also include at least one of one or more components (e.g., circuitry, logic, instructions) that implement the functions of an external memory controller (e.g., a host system memory controller), which may be referred to as or be included in a host system controller 120. For example, a host system controller 120 may issue commands or other signaling for operating the memory system 110, such as write commands, read commands, configuration signaling or other operational signaling. In some examples, the host system controller 120, or associated functions described herein, may be implemented by or be part of the processor 125. For example, a host system controller 120 may be hardware, instructions (e.g., software, firmware), or some combination thereof implemented by the processor 125 or other component of the host system 105. In various examples, a host system 105 or a host system controller 120 may be referred to as a host.

The memory system 110 provides physical memory locations (e.g., addresses) that may be used or referenced by the system 100. The memory system 110 may include a memory system controller 140 and one or more memory devices 145 (e.g., memory packages, memory dies, memory chips) operable to store data. The memory system 110 may be configurable for operations with different types of host systems 105, and may respond to commands from the host system 105 (e.g., from a host system controller 120). For example, the memory system 110 (e.g., a memory system controller 140) may receive a write command indicating that the memory system 110 is to store data received from the host system 105, or receive a read command indicating that the memory system 110 is to provide data stored in a memory device 145 to the host system 105, or receive a refresh command indicating that the memory system 110 is to refresh data stored in a memory device 145, among other types of commands and operations.

A memory system controller 140 may include at least one of one or more components (e.g., circuitry, logic, instructions) operable to control operations of the memory system 110. A memory system controller 140 may include hardware or instructions that support the memory system 110 performing various operations, and may be operable to receive, transmit, or respond to commands, data, or control information related to operations of the memory system 110. A memory system controller 140 may be operable to communicate with one or more of a host system controller 120, one or more memory devices 145, or a processor 125. In some examples, a memory system controller 140 may control operations of the memory system 110 in cooperation with the host system controller 120, a local controller 150 of a memory device 145, or any combination thereof. Although the example of memory system controller 140 is illustrated as a separate component of the memory system 110, in some examples, aspects of the functionality of the memory system 110 may be implemented by a processor 125, a host system controller 120, at least one of one or more local controllers 150, or any combination thereof.

Each memory device 145 may include a local controller 150 and one or more memory arrays 155. A memory array 155 may be a collection of memory cells (e.g., a two-dimensional array, a three-dimensional array), with each memory cell being operable to store data (e.g., as one or more stored bits). Each memory array 155 may include memory cells of various architectures, such as random access memory (RAM) cells, dynamic RAM (DRAM) cells, synchronous dynamic RAM (SDRAM) cells, static RAM (SRAM) cells, ferroelectric RAM (FeRAM) cells, magnetic RAM (MRAM) cells, resistive RAM (RRAM) cells, phase change memory (PCM) cells, chalcogenide memory cells, not-or (NOR) memory cells, and not-and (NAND) memory cells, or any combination thereof.

A local controller 150 may include at least one of one or more components (e.g., circuitry, logic, instructions) operable to control operations of a memory device 145. In some examples, a local controller 150 may be operable to communicate (e.g., receive or transmit data or commands or both) with a memory system controller 140. In some examples, a memory system 110 may not include a memory system controller 140, and a local controller 150 or a host system controller 120 may perform functions of a memory system controller 140 described herein. In some examples, a local controller 150, or a memory system controller 140, or both may include decoding components operable for accessing addresses of a memory array 155, sense components for sensing states of memory cells of a memory array 155, write components for writing states to memory cells of a memory array 155, or various other components operable for supporting described operations of a memory system 110.

A host system 105 (e.g., a host system controller 120) and a memory system 110 (e.g., a memory system controller 140) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, a conductive path) between terminals (e.g., nodes, pins, contacts) associated with the components of the system 100. A terminal may be an example of a conductive input or output point of a device of the system 100, and a terminal may be operable as part of a channel 115. To support communications over channels 115, a host system 105 (e.g., a host system controller 120) and a memory system 110 (e.g., a memory system controller 140) may include receivers (e.g., latches) for receiving signals, transmitters (e.g., drivers) for transmitting signals, decoders for decoding or demodulating received signals, or encoders for encoding or modulating signals to be transmitted, among other components that support signaling over channels 115, which may be included in a respective interface portion of the respective system.

A channel 115 be dedicated to communicating one or more types of information, and channels 115 may include unidirectional channels, bidirectional channels, or both. For example, the channels 115 may include one or more command/address channels, one or more clock signal channels, one or more data channels, among other channels or combinations thereof. In some example, a channel 115 may be configured to provide power from one system to another (e.g., from the host system 105 to the memory system 110, in accordance with a regulated voltage). In some examples, at least a subset of channels 115 may be configured in accordance with a protocol (e.g., a logical protocol, a communications protocol, an operational protocol, an industry standard), which may support configured operations of and interactions between a host system 105 and a memory system 110.

In some examples, the memory system 110 may use an error correction code (ECC) scheme to protect data stored in the memory devices 145. For example, before storing a set of data, the memory system 110 may perform an ECC encoding operation in which a set of parity bits are generated for the set of data (e.g., by performing logic operations, such as XOR operations, on the set of data according to a matrix, such as a Hamming matrix). Together, the parity bits and the corresponding set of data bits may be referred to as a codeword. The parity bits may act as a signature for the set of data and may allow the memory system 110 to detect, and potentially correct, one or more errors that the set of data incurs while stored in a memory device 145. The parity bits generated for a set of data before the set of data is written may be referred to as the first set of parity bits.

To detect errors in a set of data read from a memory device 145, the memory system 110 may perform an ECC decoding operation in which a second set of parity bits is generated for the set of data (e.g., using a similar process as described for the first set of parity bits) after reading the set of data. The memory device may then compare the first set of parity bits with the second set of parity bits (e.g., via a logic operation such as a bit-wise XOR operation) to determine any bit mismatches between the sets of parity bits. A bit mismatch may refer to the scenario in which corresponding bit positions in the sets of parity bits have different logic values.

The resulting bits from the logic operation may be referred to as syndrome bits and, together, may indicate an error status of the codeword. For example, referring to a single-error-correction double-error-detection (SECDED) ECC scheme based on an odd-weight Hamming matrix that uses 16 parity bits to protect 256 data bits (e.g., Hamming (272, 256)), if the syndrome bits are all logic 0s (e.g., indicating no mismatches between the sets of parity bits), the memory system 110 may determine that the codeword is error-free. If a threshold quantity (e.g., three, five) of the syndrome bits are logic 1s, the memory system 110 may determine that the codeword has an error. If more than the threshold quantity of the syndrome bits are logic 1s, the memory system may determine that the codeword has an uncorrectable error.

The strength of an ECC scheme may refer to the quantity of bits the ECC is capable of protecting and/or the quantity/quantities of errors the ECC scheme is capable of detecting and/or correcting. Although various examples herein are described with reference to a particular ECC scheme (e.g., a SECDED ECC scheme based on an odd-weight Hamming matrix that protects 256 data bits with 16 parity bits), the techniques described herein can be implemented using ECC schemes with different powers. The strength of an ECC scheme may also be referred to as the power of the ECC scheme, among other suitable terminology.

In some examples, the memory system 110 may receive (e.g., from the host system 105) a set of data as well as metadata information corresponding to the set of data, where metadata information refers to information about the set of data. For example, a set of data may be accompanied by metadata information, such as a metadata bit, that indicates a label for the set of data (e.g., the metadata bit may be a poison bit that indicates the set of data is associated with a process or application that has expired or terminated) so that the set of data can be properly handled when it is returned to the host system 105. Other examples of metadata information are contemplated and within the scope of the techniques described herein. Further, the techniques described herein can be used for types of information other that metadata information.

To enable return of the metadata information, some memory systems 110 may store the metadata information (e.g., in a portion of a memory array 155, which may or may not be dedicated to metadata information) in addition to storing the corresponding set of data in the memory array 155. This way, the metadata information can be read and returned along with the set of data. But storing metadata information may involve extra memory media (e.g., memory media dedicated to metadata information) and/or reduce the capacity of the memory devices for other types of information (e.g., data).

According to the techniques described herein, the memory system 110 may implement a parity bit encoding scheme that allows the memory system 110 to recover metadata information without explicitly storing the metadata information in memory media or other storage components (e.g., latches, registers) of the memory system 110. For example, if the metadata information is a single metadata bit, the memory system 110 may invert and store the first set of parity bits for a set of data if the metadata bit is a logic 1. But if the metadata bit is a logic 0, the memory system 110 may store the first set of parity bits as-is (e.g., without inversion). Thus, the inversion state of the first set of parity bits may represent the logic state of the metadata bit.

To recover the metadata bit during read operation, the memory system 110 may perform an ECC decoding operation to determine the error status of the codeword. If the ECC decoding operation indicates that the codeword is error-free or has a correctable error, the memory system 110 may determine that the first set of parity bits are not inverted. Accordingly, the memory system may determine that the logic state of the metadata bit is the logic state associated with un-inverted parity (e.g., a logic 0). If the ECC decoding operation indicates that the codeword has an uncorrectable error, the memory system 110 may perform an additional logic operation on the first set of parity bits to determine if the uncorrectable error is due to a multi-bit error in the codeword or due to the first set of parity bits being inverted (in which case the memory system 110 may determine that the state of the metadata bit is the logic state associated with inverted parity (e.g., a logic 1)).

Thus, the memory system 110 may recover and return the metadata information associated with a set of stored data even though the memory system 110 does not explicitly store the metadata information for reading during a subsequent read operation for the set of data. Although described with reference to the memory system 110, some of all aspects of the disclosed techniques may be performed by the memory system controller 140, a memory device 145, or a combination thereof.

Although various examples are described with reference to a single metadata bit, the techniques described herein can be extended to other quantities of metadata bits (e.g., by scaling the powering ECC scheme) such as for multiple metadata bits. In these examples, inversion of the first set of parity bits may involve the inversion of one or more subsets of the first set of parity bits.

In addition to applicability in systems as described herein, techniques for implicitly storing metadata may be generally implemented to support virtual reality or augmented reality applications. As the presence and use of virtual, augmented, extended, and other reality devices increases, electronic devices that support unique aspects of these technologies may be desired. For example, virtual reality and augmented reality devices and applications may benefit from faster processing to boost user immersion, and wearable electronic devices that support virtual reality or augmented reality may be subject to various size, weight, or other considerations. Implementing the techniques described herein may support virtual, augmented, extended, and other reality devices or techniques by reducing materials or size of electronic devices (because the memory system 110 can recover metadata information without consuming storage resources), which may result in smaller wearable devices), among other benefits.

Figure 2:
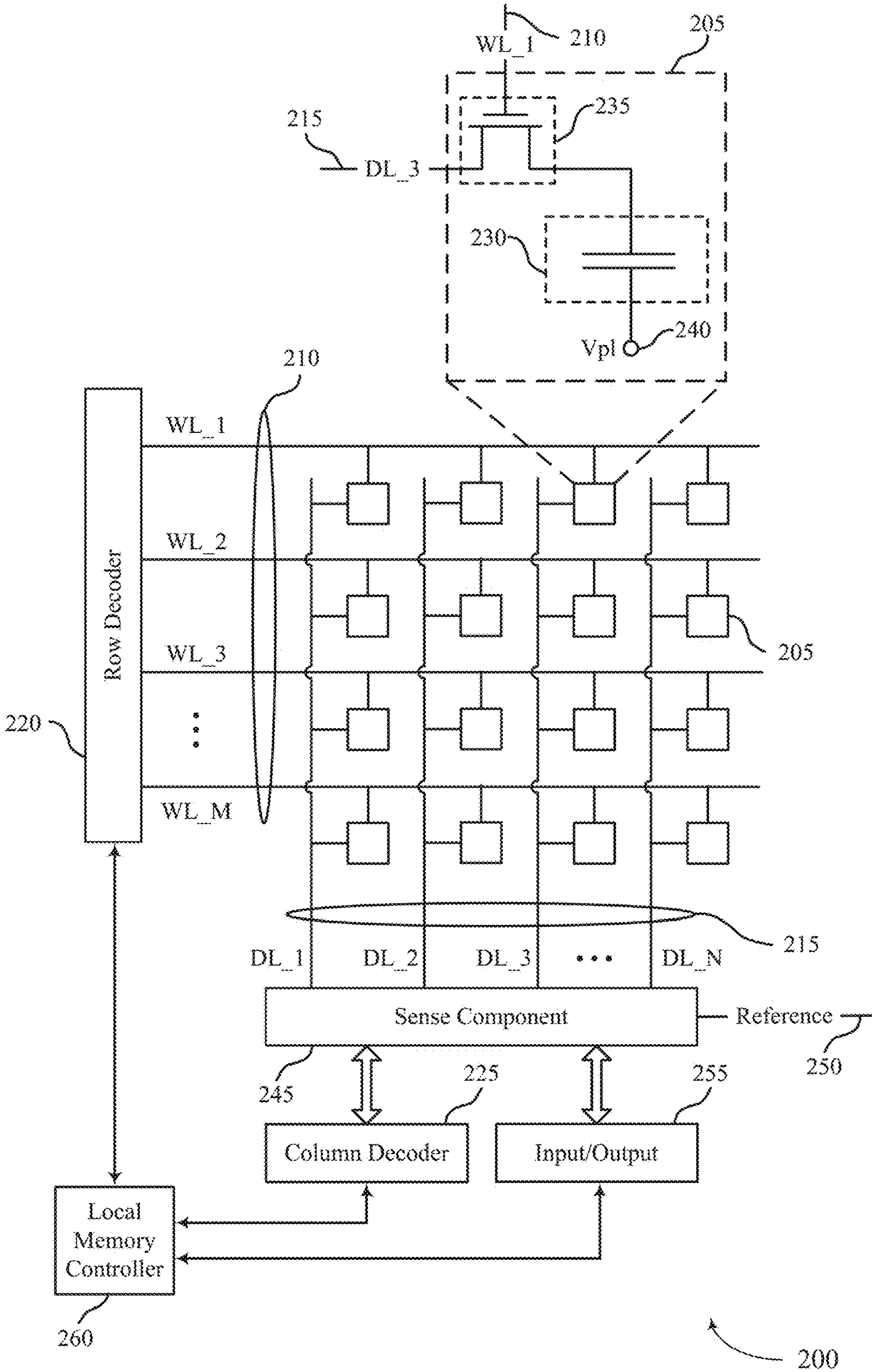
FIG. 2 shows an example of an architecture that supports implicit storage of metadata at a memory device in accordance with examples as disclosed herein.

FIG. 2 illustrates an example of an architecture 200 (e.g., a memory architecture) that supports implicit storage of metadata at a memory device in accordance with examples as disclosed herein. The architecture 200 may be implemented in a memory system 110 or one or more components thereof (e.g., memory device 145). Aspects of the architecture 200 may be referred to as or implemented in a semiconductor component, such as a memory die.

The architecture 200 includes memory cells 205 that are programmable to store information. In some examples, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). Memory cells 205 may be arranged in an array, such as in a memory array 155.

In the example of architecture 200, a memory cell 205 may include a storage component, such as capacitor 230, and a selection component 235 (e.g., a cell selection component, a transistor). A capacitor 230 may be a dielectric capacitor or a ferroelectric capacitor. A node of the capacitor 230 may be coupled with a voltage source 240, which may be a cell plate reference voltage, such as Vpl, or may be a ground voltage, such as Vss. A charge stored by a memory cell 205 (e.g., by a capacitor 230) may be representative of a programmed state. Other memory architectures that support the techniques described herein may implement different types or arrangements of storage components and associated circuitry (e.g., with or without a selection component).

The architecture 200 may include various arrangements of access lines, such as word lines 210 and digit lines 215. An access line may be a conductive line that is coupled with a memory cell 205, and may be used to perform access operations on the memory cell 205. Word lines 210 may be referred to as row lines, and digit lines 215 may be referred to as column lines or bit lines, among other nomenclature. Memory cells 205 may be positioned at intersections of access lines, and an intersection may be referred to as an address of a memory cell 205.

In some architectures, a word line 210 may be coupled with a gate of a selection component 235 of a memory cell 205, and may be operable to control (e.g., switch, modulate a conductivity of) the selection component 235. A digit line 215 may be operable to couple a memory cell 205 with a sense component 245. In some architectures, a memory cell 205 (e.g., a capacitor 230) may be coupled with a digit line 215 during portions of an access operation. For example, a word line 210 and a selection component 235 of a memory cell 205 may be operable to couple or isolate a capacitor 230 of the memory cell 205 with a digit line 215.

Operations such as reading and writing may be performed on memory cells 205 by activating (e.g., applying a voltage to) access lines such as a word line 210 or a digit line 215. Accessing the memory cells 205 may be controlled through a row decoder 220, or a column decoder 225, or a combination thereof. For example, a row decoder 220 may receive a row address (e.g., from a local memory controller 260) and activate a word line 210 based on a received row address, and a column decoder 225 may receive a column address and activate a digit line 215 based on a received column address. Selecting or deselecting a memory cell 205 may include activating or deactivating a selection component 235 using a word line 210. For example, a capacitor 230 may be isolated from a digit line 215 when the selection component 235 is deactivated, and the capacitor 230 may be coupled with the digit line 215 when the selection component 235 is activated.

A sense component 245 may be operable to detect a state (e.g., a charge) stored by a capacitor 230 of a memory cell 205 and determine a logic state of the memory cell 205 based on the stored state. A sense component 245 may include one or more sense amplifiers to amplify or otherwise convert a signal resulting from accessing the memory cell 205. The sense component 245 may compare a signal detected from the memory cell 205 with a reference 250 (e.g., a reference voltage). The detected logic state of the memory cell 205 may be provided as an output of the sense component 245 (e.g., via an input/output 255), and may indicate the detected logic state to another component of a memory system 110 that implements the architecture 200.

The local memory controller 260 may control the accessing of memory cells 205 through the various components (e.g., a row decoder 220, a column decoder 225, a sense component 245), and may be an example of or otherwise included in a local controller 150, or a memory system controller 140, or both. In some examples, one or more of a row decoder 220, a column decoder 225, and a sense component 245 may be co-located with or included in the local memory controller 260. The local memory controller 260 may be operable to receive commands or data from one or more different controllers (e.g., a host system controller 120, a memory system controller 140), translate the commands or the data into information that can be used by the architecture 200, initiate or control one or more operations of the architecture 200, and communicate data from the architecture 200 to a host (e.g., a host system 105) based on performing the one or more operations.

The local memory controller 260 may be operable to perform one or more access operations on one or more memory cells 205 of the architecture 200. Examples of an access operation may include a write operation, a read operation, a refresh operation, a precharge operation, or an activate operation, among others. In some examples, an access operation may be performed by or otherwise coordinated by the local memory controller 260 in response to one or more access commands (e.g., from a host system 105). The local memory controller 260 may be operable to perform other access operations not listed here or other operations related to the operating of the architecture 200 that are not directly related to accessing the memory cells 205.

In some examples, the architecture may be included in a device such as the memory system 110 or a memory device 145. If the device receives (e.g., for writing) a set of data and corresponding metadata information, the device may generate a first set of parity bits for the set of data and may selectively invert the first set of parity bits based on the metadata information. During a read operation for the stored set of data, the device may perform an ECC decoding operation on the set of data using the first set of parity bits and second set of parity bits generated from the stored set of data. The device may recover the metadata information for the set of data based on an error status determined for the set of data via the ECC decoding operation.

For example, if the ECC decoding operation indicates that set of data is error-free (also referred to as "errorless") or that the set of data has a correctable error, the device may determine that the first set of parity bits are not inverted and thus, that the metadata bit has the logic value associated with un-inverted parity. If the ECC decoding operation indicates that the set of data has an uncorrectable error, the device may compare the first set of parity bits with the second set of parity bits to determine the inversion status of the first set of parity bits, which the device may in turn use to A) determine an updated error status for the set of data, and B) recover the metadata bit.

If the comparison indicates that the first set of parity bits are completely inverted relative to the second set of parity bits (where complete inversion refers to the scenario in which each bit in the first set of parity bits has a different logic value than a corresponding bit in the second set of parity bits), the device may determine A) that the set of data is correct (e.g., error-free), and B) that the metadata bit has the logic value associated with inverted parity. If the comparison indicates that the first set of parity bits have a first threshold quantity of inverted bits relative to the second set of parity bits, the device may determine A) that the set of data has a correctable error, and B) that the metadata bit has the logic value associated with inverted parity. If the comparison indicates that the first set of parity bits have a second threshold quantity (e.g., higher than the first threshold quantity) of inverted bits relative to the second set of parity bits, the device may determine A) that the set of data has an uncorrectable error, and B) that the metadata bit is indeterminate.

Thus, the device may conserve memory media by using the inversion status of parity bits to represent metadata information rather than explicitly storing the metadata information for reading during a read operation for the corresponding set of data.

Figure 3:
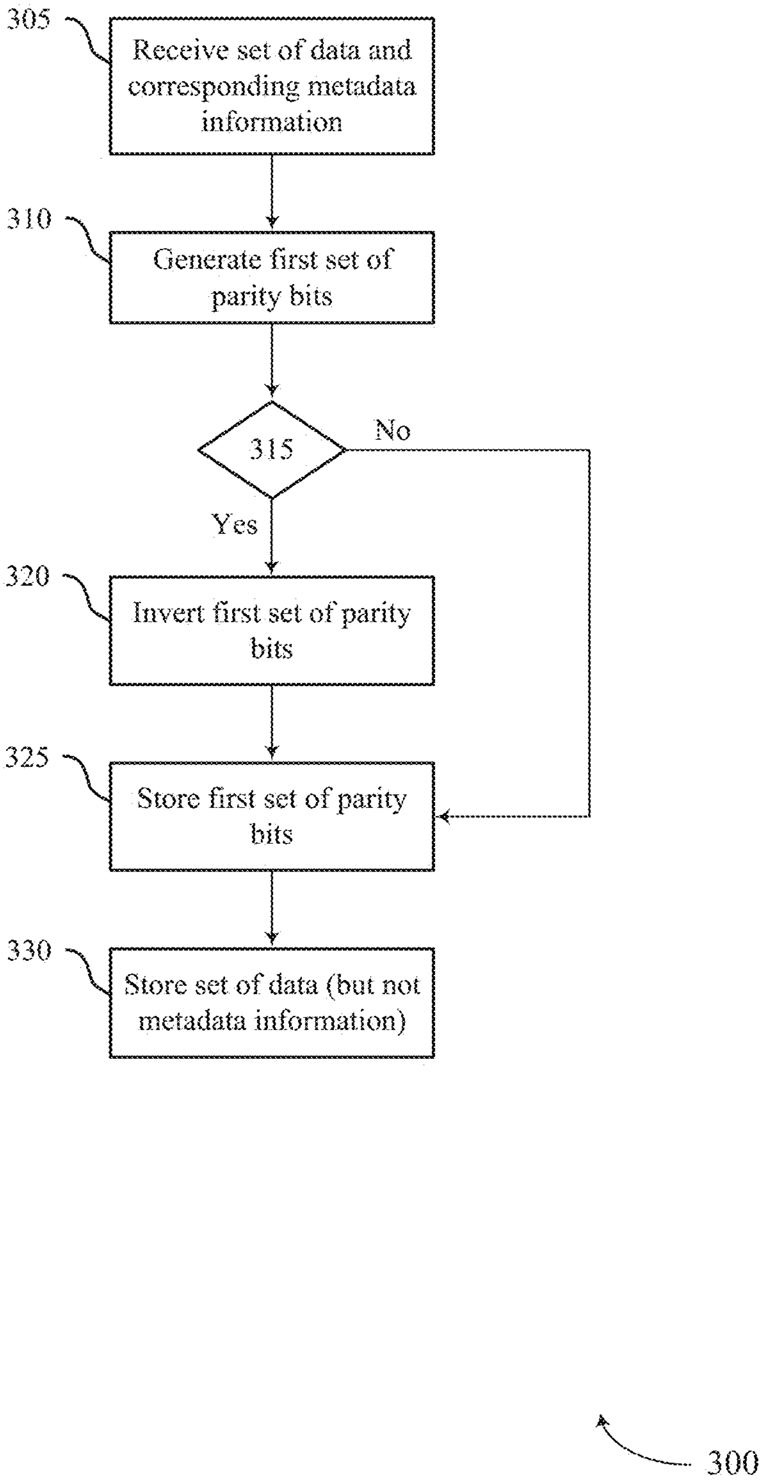
FIG. 3 shows an example of a process flow that supports implicit storage of metadata at a memory device in accordance with examples as disclosed herein.

FIG. 3 shows an example of a process flow 300 that supports implicit storage of metadata at a memory device in accordance with examples as disclosed herein. The process flow 300 may be implemented by a device such as the memory system 110, the memory system controller 140, the memory device 145, or a device that includes architecture 200. The process flow 300 may be an example of a write process implemented by the device. The write process may facilitate the encoding of parity bits to represent metadata information so that the device can recover the metadata information during a corresponding read process (e.g., without explicitly reading the metadata information). Although described with reference to a single metadata bit, the process flow 300 may be implemented or extended to other quantities of metadata bits (e.g., two or more metadata bits).

At 305, the device may receive a set of data and corresponding metadata information (e.g., the metadata bit) for the set of data. For example, the device may receive the set of data and a metadata bit, which has a logic value (e.g., a logic 0 or a logic 1). The set of data may be associated with a received write command that indicates the device is to store the set of data in memory. In some examples, the metadata bit may be a label or other classifier for the set of data. For instance, the metadata bit may be a poison bit that indicates the set of data is associated with a process or application that has expired or terminated (e.g., so that the host device can properly handle the set of data when it is returned to the host device). In some examples, the metadata information may be associated with an application (e.g., a Machine Check Architecture application) that uses the metadata information to handle the set of data.

At 310, the device may generate (e.g., as part of an ECC encoding operation) a first set of parity bits (e.g., one or more parity bits) for the set of data. For example, the device may generate the first set of parity bits by performing one or more logic operations (e.g., XOR operations) on the set of data according to a Hamming matrix associated with the ECC scheme. Thus, the first set of parity bits may be based on the set of data. An XOR operation performed on two input bits may output an output bit that is a logic 1 if the two input bits have different logic values (e.g., a logic 1 and a logic 0) and may output an output bit that is a logic 0 if the two input bits have the same logic value (e.g., are both logic 0, are both logic 1).

At 315, the device may determine whether the logic value of the metadata bit is a specific logic value, such as a logic 1. In process flow 300, in some examples, a logic 1 may be associate with parity inversion and a logic 0 may be associated with no parity inversion. However, alternative associations are contemplated and within the scope of the present disclosure.

If, at 315, the device determines that the metadata bit is a logic 1 (e.g., the logic value associated with parity inversion), the device may proceed to 320 and invert the first set of parity bits. For example, the device may perform a bit-wise inversion of the first set of parity bits so that each bit in the first set of parity bits is inverted. As an example, if the first set of parity bits is 0b'1001,0001, 1110,1010 before inversion, the first set of parity bits may be 0b'0110, 1110,0001,0101 after inversion. In some examples, the first set of parity bits after inversion maybe referred to as the inverted first set of parity bits or as the inverted version of the first set of parity bits.

After inverting the first set of parity bits, the device may, at 325, store the first set of parity bits (e.g., the inverted version of the first set of parity bits).

If, at 315, the device determines that the metadata bit is a logic 0 (e.g., the logic value associated with no parity inversion), the device may proceed to 325 (skipping over 320) and store the first set of parity bits without inversion.

At 330, the device may store the set of data for reading during a subsequent read operation for the set of data. However, the device may not the metadata information for reading during the subsequent read operation for the set of data. For example, the device may discard the metadata information instead of storing the metadata in the device.

Thus, the device may encode (e.g., via inversion) at least some of the first set of parity bits to represent the logic value of the metadata bit, which may allow the device (e.g., during a read process) to recover the metadata information even though the device did not explicitly store the metadata information for reading during a subsequent read operation for the set of data.

Figure 4:
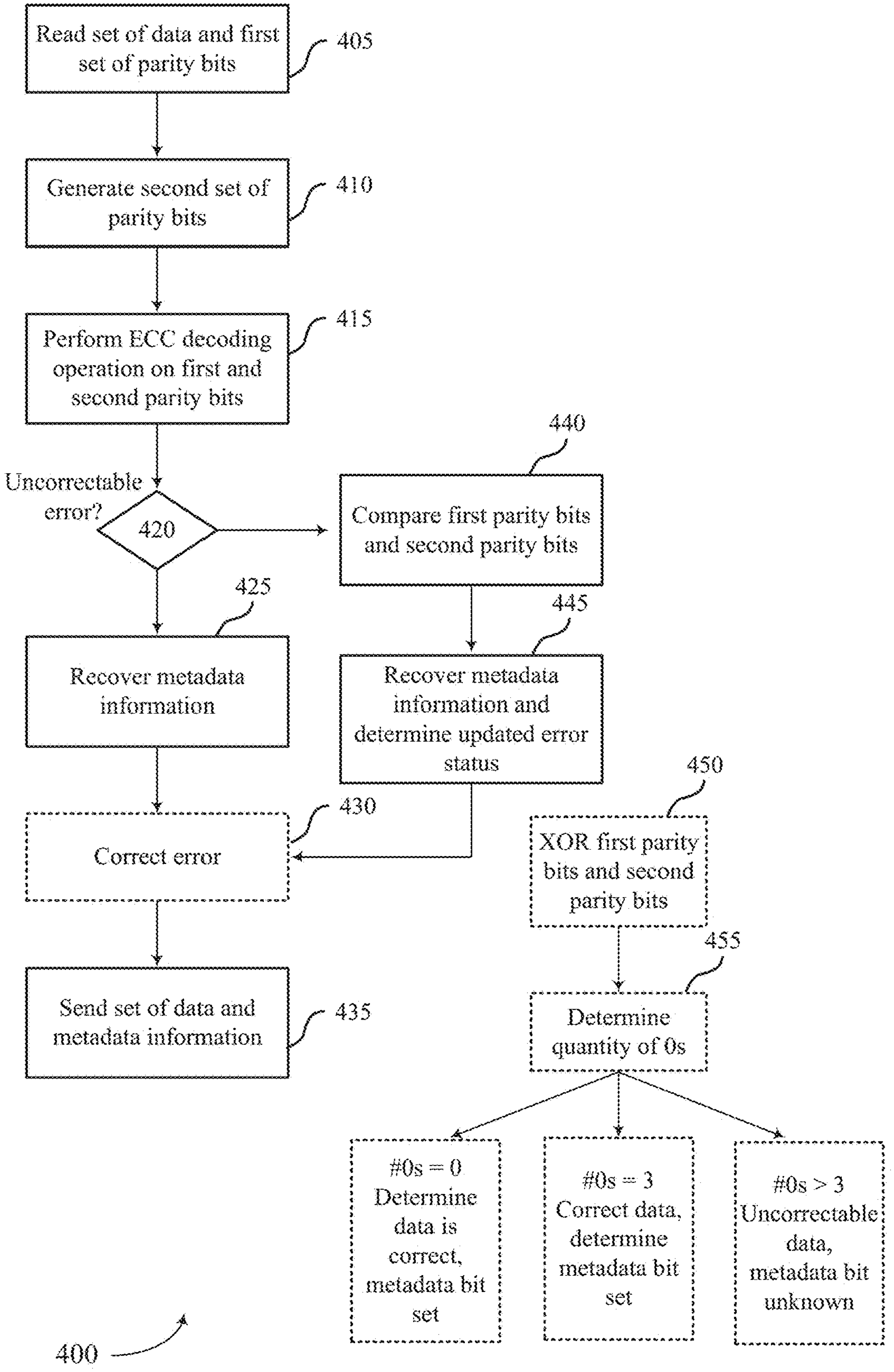
FIG. 4 shows an example of a process flow that supports implicit storage of metadata at a memory device in accordance with examples as disclosed herein.

FIG. 4 shows an example of a process flow 400 that supports implicit storage of metadata at a memory device in accordance with examples as disclosed herein. The process flow 400 may be implemented by a device such as the device described with reference to FIG. 3. The process flow 400 may be an example of a read process implemented by the device after the write process described with reference to FIG. 3. The read process may facilitate the decoding of parity bits whose inversion status represents metadata information so that the device can recover the metadata information. Although described with reference to a single metadata bit, the process flow 400 may be implemented or extended to other quantities of metadata bits (e.g., two or more metadata bits).

The process flow 400 may involve the set of data and the first set of parity bits discussed with reference to the process flow 300. At 405, the device may read, from memory, the set of data and the first set of parity bits. The device may read the set of data and the first set of parity bits based on (e.g., in response to) a read command for the set of data.

At 410, the device may generate a second set of parity bits for the set of data based on reading the set of data (e.g., using the read set of data). The second set of parity bits may be generated via a similar process as the first set of parity bits described herein.

At 415, the device may perform an ECC decoding operation on the first set of parity bits and the second set of parity bits. For example, the device may perform a bitwise XOR operation on the first set of parity bits and the second set of parity bits to generate a set of syndrome bits.

At 420, the device may determine an error status for the set of data based on the set of syndrome bits for the set of data. For example, the device may use the set of syndrome bits to determine whether the set of data is error-free, has a correctable error, or has an uncorrectable error. In some scenarios, the device may determine that the set of data is error-free is the set of syndrome bits has a first quantity of logic 1s (e.g., zero, less than a threshold), may determine that the set of data has a correctable error or an uncorrectable error if the set of syndrome bits has a second quantity of logic 1s (e.g., more than zero, equal to or more than a threshold). The device may distinguish between a correctable error and an uncorrectable error using an error lookup table that associates various syndrome patters with error positions. For example, if the set of syndrome bits is associated with an error in the lookup table, the device may determine that the set of data has a correctable error. Otherwise (e.g., if the set of syndrome bits is not associated with an error in the lookup table), the device may determine that the set of data has an uncorrectable error.

If, at 420, the device determines that the set of data is error-free or has a correctable error (indicating that the first set of parity bits are not inverted), the device may proceed to 425 and recover the metadata information corresponding to the set of data. For example, the device may determine that the metadata bit has the logic state associated with no parity inversion (e.g., logic 0) based on the set of data being error-free or having a correctable error (e.g., based on the set of data not having an uncorrectable error).

At 430, if the set of data has a correctable error, the device may correct the correctable error. For example, the device may use the error lookup table to determine the bit position of the bit (in the set of data) that is in error and may correct (e.g., invert) the bit. At 435, the device may send to the host system: A) the set of data (which may be the corrected set of data from 430) to the host system and B) the metadata information (e.g., the metadata bit).

If, at 420, the device determines that the set of syndrome bits indicates that the set of data has an uncorrectable error (indicating that the first set of parity bits may be inverted), the device may proceed to 440 and compare the first set of parity bits to the second set of parity bits. In some examples, comparing the first set of parity bits to the second set of parity bits may involve performing a logic operation on the first set of parity bits and the second set of parity bits. For example, the device may perform a bitwise XOR operation on the first set of parity bits and the second set of parity bits. A bitwise operation may refer to an operation that is perform on a bit-by-bit basis.

At 445, the device may recover the metadata information and may determine an updated error status for the set of data based on the comparison (which may indicate the inversion status of the first set of parity bits). For example, if the comparison at 445 indicates that the first set of parity bits is completely inverted relative to the second set of parity bits, the device may determine that the uncorrectable error determined at 420 was due to the inversion of the first set of parity bits (and not an uncorrectable error in the set of data). Accordingly, the device may determine A) that the metadata bit has the logic state associated with parity inversion (e.g., logic 1), and B) that the set of data is error-free.

If the comparison at 445 indicates that the first set of parity bits is partially inverted relative to the second set of parity bits, the device may determine whether the quantity of inverted bits satisfies a first threshold or a second threshold higher than the first threshold. If the quantity of inverted bits satisfies the first threshold but not the second threshold, the device may determine that the set of data has a correctable error and that the metadata bit has the logic state associated with parity inversion (e.g., logic 1). If the quantity of inverted bits satisfies the second threshold, the device may determine that the set of data has an uncorrectable error and that the logic state of the metadata bit is indeterminate.

After 445, the device may proceed to 435 and send to the host system: A) the set of data (which may be the corrected set of data from 430) to the host system and B) the metadata information (e.g., the metadata bit).

In some examples, the operations at 450 and 455 may be performed as part of 440 and 445.

For example, to perform the comparison at 440, the device may perform a bitwise logic operation (e.g., an XOR operation) on the first set of parity bits and the second set of parity bits. The XOR operation may produce a set of output bits. To recover the metadata at 445, the device may determine the quantity of bits in the set of output bits that are a first logic value (e.g., logic 0). As noted, in an XOR operation on two input bits, a logic 0 is output if the two input bits are the same; otherwise a logic 1 is output. So, an output bit that is a logic 0 indicates that the two input bits corresponding to the output bit are the same (e.g., match, have the same logic value). And an output bit that is a logic 1 indicates that the two input bits corresponding to the output bit are different (e.g., do not match, have different logic values).

So, the logic values of the output bits may indicate an inversion status of the first set of parity bits relative to the second set of parity bits and an updated error status for the set of data (relative to the error status determined at 420).

Referring to a SECDED ECC scheme based on an odd-weight Hamming matrix that uses 16 parity bits to protect 256 data bits, if the quantity of logic 0 output bits is zero (which the device may determine by comparing the quantity with a threshold quantity, such as zero), the device may determine that the first set of parity bits is completely inverted relative to the second set of parity bits (e.g., that the metadata bit is a logic 1) and that the set of data is correct. If the quantity of logic 0 output bits is three (which the device may determine by comparing the quantity with a threshold quantity, such as three), the device may determine that the first set of parity bits is completely inverted relative to the second set of parity bits (e.g., that the metadata bit is a logic 1) and that the set of data has a correctable error. If the quantity of logic 0 output bits is more than three (which the device may determine by comparing the quantity with a threshold quantity, such as three), the device may determine the set of data has an uncorrectable error and that the logic value of the metadata bit is indeterminate.

Although described with reference to an ECC scheme that is based on a Hamming matrix that uses 16 parity bits to protect 256 data bits and that has, for example, three logic 1s per column, the techniques described herein can be implemented for other ECC schemes, including an ECC scheme that is based on a Hamming matrix that has five logic 1s per column. In such an example, the device may determine that the data is error-free and that the metadata bit is set if the quantity of logic 0s is zero, may determine that the data has a correctable error and the metadata bit is set if the quantity of logic 0s is five, and may determine that the data has an uncorrectable error and that the metadata bit is indeterminate if the quantity of logic 1s is greater than five.

As noted, at 430, the device may correct any correctable error(s). For example, if the updated error status for the set of data indicates that the set of data has a correctable error, the device may invert the first set of parity bits and XOR the first set of parity bits with the second set of parity bits to generate a set of syndrome bits that the device uses, along with the error lookup table, to identify the one or more bits of the set of data that are in error. At 435, the device may send the set of data to the requesting host system as well as the corresponding metadata information. In some examples, the device may additionally or alternatively send an indication of the error status of the set of data (e.g., whether the set of data is uncorrectable data, corrected data or error-free data).

Thus, the device may recover metadata information for a set of data during a read operation even though the device does not explicitly store the metadata information for retrieval (e.g., reading) during the read operation.

Figure 5:
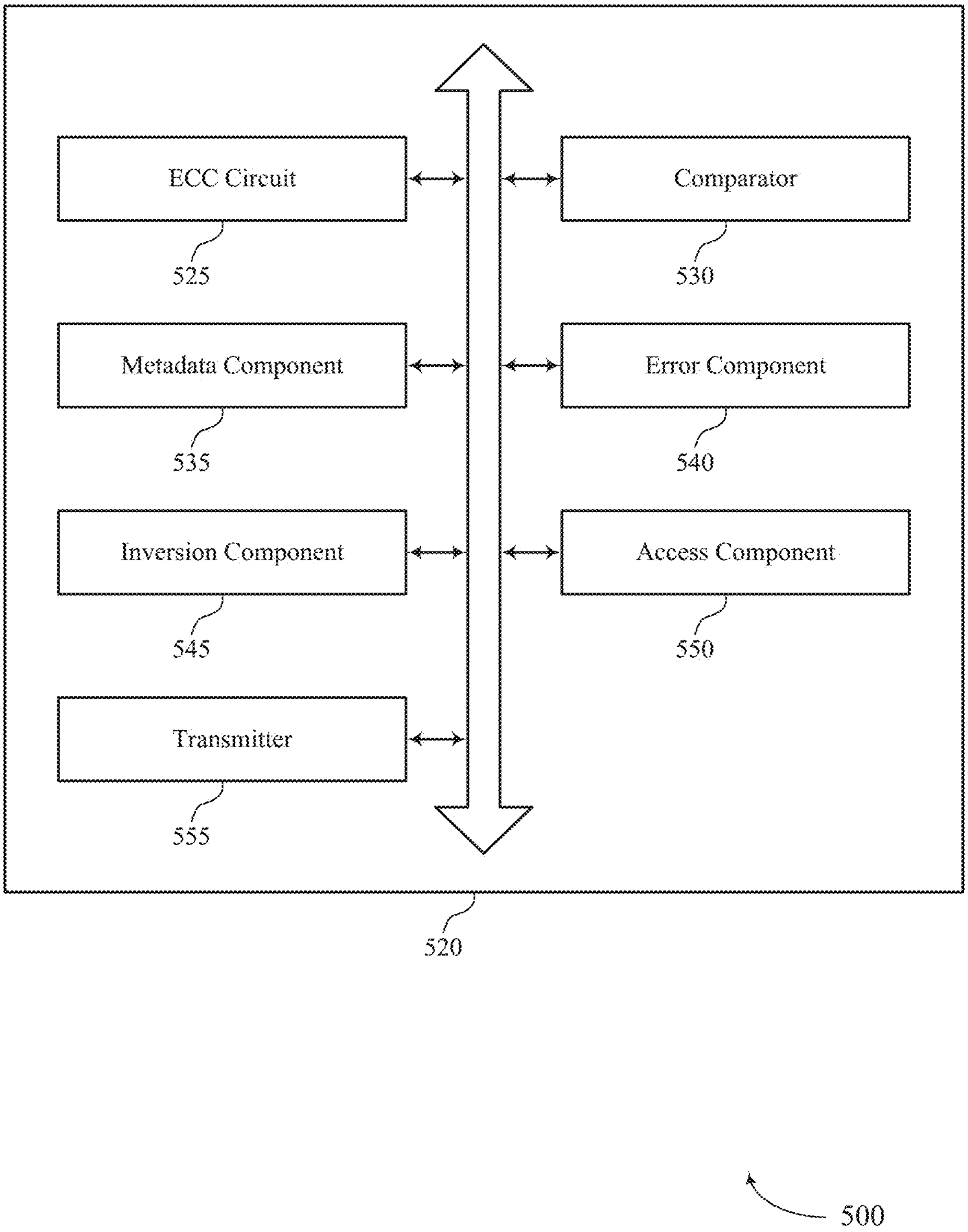
FIG. 5 shows a block diagram of a memory device that supports implicit storage of metadata at a memory device in accordance with examples as disclosed herein.

FIG. 5 shows a block diagram 500 of a memory device 520 that supports implicit storage of metadata at a memory device in accordance with examples as disclosed herein. The memory device 520 may be an example of aspects of a memory device as described with reference to FIGS. 1 through 4. The memory device 520, or various components thereof, may be an example of means for performing various aspects of implicit storage of metadata at a memory device as described herein. For example, the memory device 520 may include a ECC circuit 525, a comparator 530, a metadata component 535, an error component 540, an inversion component 545, an access component 550, a transmitter 555, or any combination thereof. Each of these components, or components of subcomponents thereof (e.g., one or more processors, one or more memories), may communicate, directly or indirectly, with one another (e.g., via one or more buses).

The ECC circuit 525 may be configured as or otherwise support a means for performing, by a memory device, an error correction code (ECC) decoding operation on a first set of parity bits for a set of data and a second set of parity bits for the set of data. The comparator 530 may be configured as or otherwise support a means for comparing, based at least in part on the ECC decoding operation indicating that the set of data has an uncorrectable error, the first set of parity bits to the second set of parity bits. The metadata component 535 may be configured as or otherwise support a means for recovering metadata information, for the set of data, previously received by the memory device, based at least in part on the comparison.

In some examples, the error component 540 may be configured as or otherwise support a means for determining an updated error status for the set of data based at least in part on the comparison.

In some examples, the error component 540 may be configured as or otherwise support a means for determining, based at least in part on the comparison, that the first set of parity bits do not match the second set of parity bits, where the metadata information is recovered, and the set of data is determined to be error-free, based at least in part on the determination.

In some examples, the error component 540 may be configured as or otherwise support a means for determining, based at least in part on the comparison, that the first set of parity bits includes a threshold quantity of bits that do not match the second set of parity bits, where the metadata information is recovered, and the set of data is determined to have a correctable error, based at least in part on the determination.

In some examples, to support comparing the first set of parity bits to the second set of parity bits, the comparator 530 may be configured as or otherwise support a means for performing a bitwise XOR operation on the first set of parity bits and the second set of parity bits.

In some examples, the comparator 530 may be configured as or otherwise support a means for determining a quantity of bits in a set of output bits, from the bitwise XOR operation, that are a first logic value, where the metadata information is recovered based at least in part on the quantity of bits.

In some examples, the comparator 530 may be configured as or otherwise support a means for comparing the quantity of bits to a threshold quantity, where the metadata information is recovered based at least in part on comparing the quantity of bits to the threshold quantity.

In some examples, the metadata information is a single metadata bit. In some examples, the metadata component 535 may be configured as or otherwise support a means for determining, based at least in part on the comparison, that the first set of parity bits is inverted relative to the second set of parity bits, where the metadata bit is recovered based at least in part on determining that the first set of parity bits is inverted relative to the second set of parity bits.

In some examples, the metadata component 535 may be configured as or otherwise support a means for determining, based at least in part on the comparison, that the first set of parity bits includes a threshold quantity of bits that match the second set of parity bits, where the metadata bit is recovered based at least in part on determining that the first set of parity bits includes the threshold quantity of bits that match the second set of parity bits.

In some examples, the inversion component 545 may be configured as or otherwise support a means for inverting, based at least in part on the metadata information, the first set of parity bits before storing the first set of parity bits in the memory device. In some examples, the access component 550 may be configured as or otherwise support a means for reading the first set of parity bits from the memory device after storing the first set of parity bits in the memory device, where the ECC decoding operation is performed based at least in part on reading the first set of parity bits.

In some examples, the ECC circuit 525 may be configured as or otherwise support a means for generating, after reading the set of data, the second set of parity bits based at least in part on the set of data.

In some examples, the ECC circuit 525 may be configured as or otherwise support a means for performing, by a memory device, an error correction code (ECC) decoding operation for a set of data. The error component 540 may be configured as or otherwise support a means for determining an error status for the set of data based at least in part on performing the ECC decoding operation. In some examples, the metadata component 535 may be configured as or otherwise support a means for recovering metadata information for the set of data, the metadata information previously received by the memory device, based at least in part on the error status for the set of data.

In some examples, the metadata information is a single metadata bit. In some examples, the metadata information includes multiple metadata bits.

In some examples, the set of data is determined to be error-free, and the transmitter 555 may be configured as or otherwise support a means for sending the set of data, along with the metadata information, to a host system.

In some examples, the set of data is determined to have a correctable error, and the ECC circuit 525 may be configured as or otherwise support a means for correcting the set of data based at least in part on the set of data having a correctable error. In some examples, the set of data is determined to have a correctable error, and the transmitter 555 may be configured as or otherwise support a means for sending the corrected set of data, along with an indication of the metadata information, to a host system.

In some examples, the ECC decoding operation is performed on a first set of parity bits and a second set of parity bits for the set of data, and the comparator 530 may be configured as or otherwise support a means for comparing the first set of parity bits and the second set of parity bits based at least in part on determining that the set of data has an uncorrectable error, where the metadata information is recovered, and an updated error status for the set of data is determined, based at least in part on the comparison.

In some examples, the metadata component 535 may be configured as or otherwise support a means for determining, based at least in part on the comparison, that the first set of parity bits is inverted relative to the second set of parity bits, where the metadata information is recovered, and the set of data is determined to be error-free, based at least in part on the first set of parity bits being inverted relative to the second set of parity bits.

In some examples, the metadata component 535 may be configured as or otherwise support a means for determining, based at least in part on the comparison, that the first set of parity bits includes a threshold quantity of bits that match the second set of parity bits, where the metadata information is recovered, and the set of data is determined to have a correctable error, based at least in part on the first set of parity bits including a threshold quantity of bits that match the second set of parity bits.

In some examples, the ECC decoding operation is performed on a first set of parity bits and a second set of parity bits for the set of data, and the inversion component 545 may be configured as or otherwise support a means for inverting the first set of parity bits before storing the first set of parity bits in the memory device and based at least in part on the metadata information, where the ECC decoding operation is performed after reading the first set of parity bits from the memory device.

In some examples, the described functionality of the memory device 520, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory device 520, or various components thereof, may be implemented at least in part by instructions (e.g., stored in memory, non-transitory computer-readable medium) executable by such at least one processor.

Figure 6:
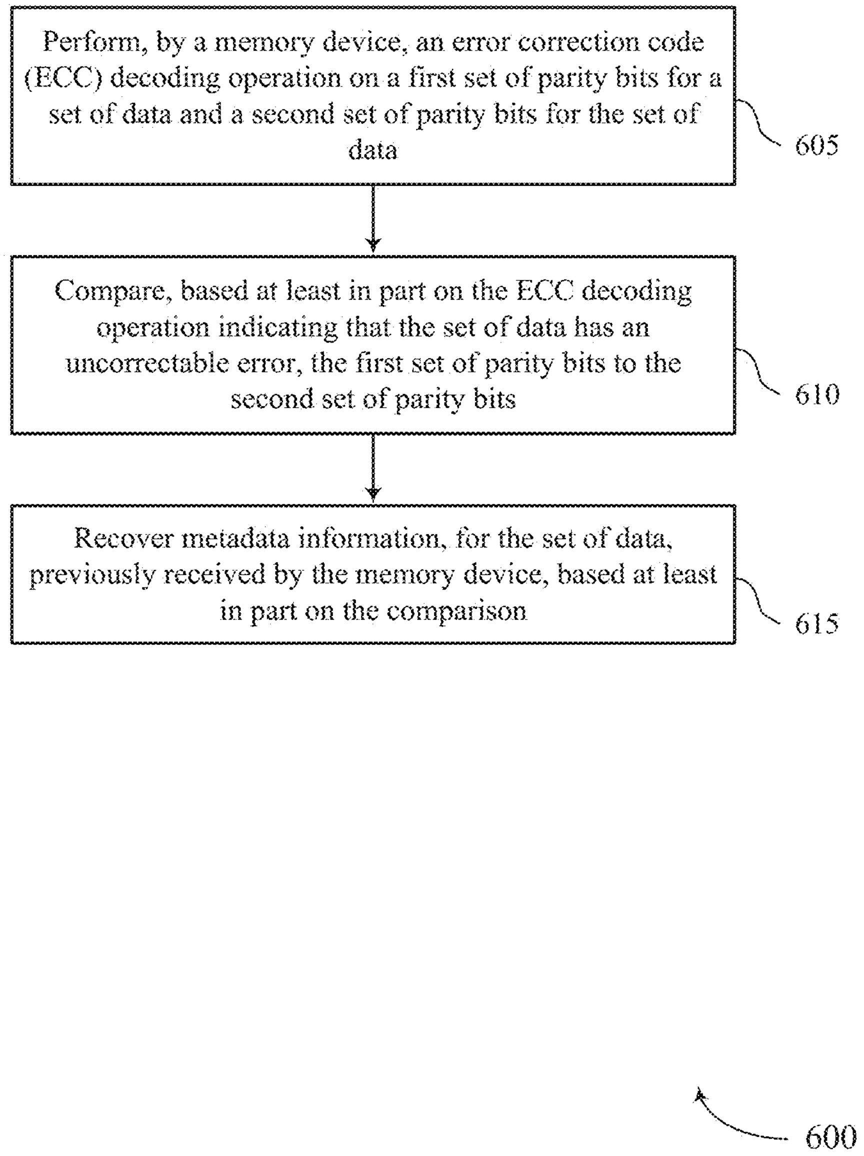
FIGS. 6 and 7 show flowcharts illustrating a method or methods that support implicit storage of metadata at a memory device in accordance with examples as disclosed herein.

FIG. 6 shows a flowchart illustrating a method 600 that supports implicit storage of metadata at a memory device in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 605, the method may include performing, by a memory device, an error correction code (ECC) decoding operation on a first set of parity bits for a set of data and a second set of parity bits for the set of data. In some examples, aspects of the operations of 605 may be performed by a ECC circuit 525 as described with reference to FIG. 5.

At 610, the method may include comparing, based at least in part on the ECC decoding operation indicating that the set of data has an uncorrectable error, the first set of parity bits to the second set of parity bits. In some examples, aspects of the operations of 610 may be performed by a comparator 530 as described with reference to FIG. 5.

At 615, the method may include recovering metadata information, for the set of data, previously received by the memory device, based at least in part on the comparison. In some examples, aspects of the operations of 615 may be performed by a metadata component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for performing, by a memory device, an error correction code (ECC) decoding operation on a first set of parity bits for a set of data and a second set of parity bits for the set of data; comparing, based at least in part on the ECC decoding operation indicating that the set of data has an uncorrectable error, the first set of parity bits to the second set of parity bits; and recovering metadata information, for the set of data, previously received by the memory device, based at least in part on the comparison.

Aspect 2: The method, apparatus, or non-transitory computer-readable medium of aspect 1, further including operations, features, circuitry, logic, means, or instructions, or any combination thereof for determining an updated error status for the set of data based at least in part on the comparison.

Aspect 3: The method, apparatus, or non-transitory computer-readable medium of aspect 2, further including operations, features, circuitry, logic, means, or instructions, or any combination thereof for determining, based at least in part on the comparison, that the first set of parity bits do not match the second set of parity bits, where the metadata information is recovered, and the set of data is determined to be error-free, based at least in part on the determination.

Aspect 4: The method, apparatus, or non-transitory computer-readable medium of any of aspects 2 through 3, further including operations, features, circuitry, logic, means, or instructions, or any combination thereof for determining, based at least in part on the comparison, that the first set of parity bits includes a threshold quantity of bits that do not match the second set of parity bits, where the metadata information is recovered, and the set of data is determined to have a correctable error, based at least in part on the determination.

Aspect 5: The method, apparatus, or non-transitory computer-readable medium of any of aspects 1 through 4, where comparing the first set of parity bits to the second set of parity bits includes operations, features, circuitry, logic, means, or instructions, or any combination thereof for performing a bitwise XOR operation on the first set of parity bits and the second set of parity bits.

Aspect 6: The method, apparatus, or non-transitory computer-readable medium of aspect 5, further including operations, features, circuitry, logic, means, or instructions, or any combination thereof for determining a quantity of bits in a set of output bits, from the bitwise XOR operation, that are a first logic value, where the metadata information is recovered based at least in part on the quantity of bits.

Aspect 7: The method, apparatus, or non-transitory computer-readable medium of aspect 6, further including operations, features, circuitry, logic, means, or instructions, or any combination thereof for comparing the quantity of bits to a threshold quantity, where the metadata information is recovered based at least in part on comparing the quantity of bits to the threshold quantity.

Aspect 8: The method, apparatus, or non-transitory computer-readable medium of any of aspects 1 through 7, where the metadata information is a single metadata bit.

Aspect 9: The method, apparatus, or non-transitory computer-readable medium of aspect 8, further including operations, features, circuitry, logic, means, or instructions, or any combination thereof for determining, based at least in part on the comparison, that the first set of parity bits is inverted relative to the second set of parity bits, where the metadata bit is recovered based at least in part on determining that the first set of parity bits is inverted relative to the second set of parity bits.

Aspect 10: The method, apparatus, or non-transitory computer-readable medium of any of aspects 8 through 9, further including operations, features, circuitry, logic, means, or instructions, or any combination thereof for determining, based at least in part on the comparison, that the first set of parity bits includes a threshold quantity of bits that match the second set of parity bits, where the metadata bit is recovered based at least in part on determining that the first set of parity bits includes the threshold quantity of bits that match the second set of parity bits.

Aspect 11: The method, apparatus, or non-transitory computer-readable medium of any of aspects 1 through 10, further including operations, features, circuitry, logic, means, or instructions, or any combination thereof for inverting, based at least in part on the metadata information, the first set of parity bits before storing the first set of parity bits in the memory device and reading the first set of parity bits from the memory device after storing the first set of parity bits in the memory device, where the ECC decoding operation is performed based at least in part on reading the first set of parity bits.

Aspect 12: The method, apparatus, or non-transitory computer-readable medium of aspect 11, further including operations, features, circuitry, logic, means, or instructions, or any combination thereof for generating, after reading the set of data, the second set of parity bits based at least in part on the set of data.

Figure 7:
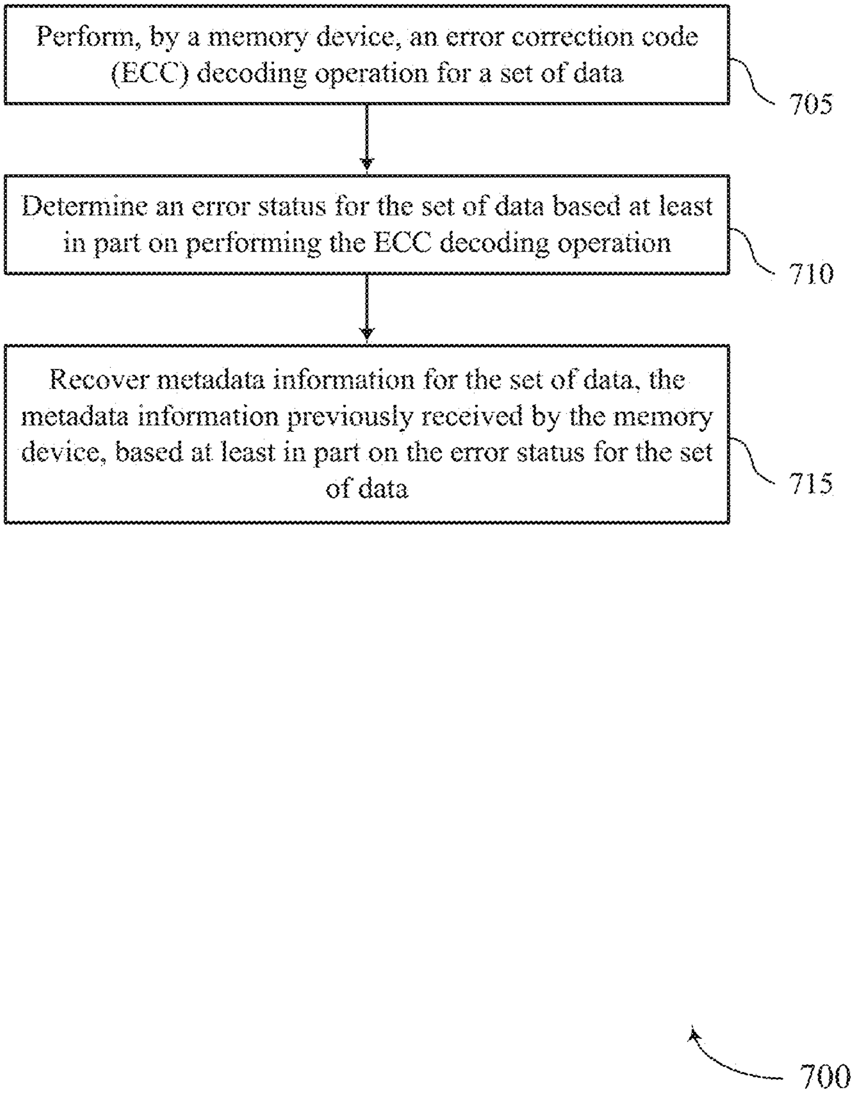

FIG. 7 shows a flowchart illustrating a method 700 that supports implicit storage of metadata at a memory device in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 705, the method may include performing, by a memory device, an error correction code (ECC) decoding operation for a set of data. In some examples, aspects of the operations of 705 may be performed by a ECC circuit 525 as described with reference to FIG. 5.

At 710, the method may include determining an error status for the set of data based at least in part on performing the ECC decoding operation. In some examples, aspects of the operations of 710 may be performed by an error component 540 as described with reference to FIG. 5.

At 715, the method may include recovering metadata information for the set of data, the metadata information previously received by the memory device, based at least in part on the error status for the set of data. In some examples, aspects of the operations of 715 may be performed by a metadata component 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 13: A method, apparatus, or non-transitory computer-readable medium including operations, features, circuitry, logic, means, or instructions, or any combination thereof for performing, by a memory device, an error correction code (ECC) decoding operation for a set of data; determining an error status for the set of data based at least in part on performing the ECC decoding operation; and recovering metadata information for the set of data, the metadata information previously received by the memory device, based at least in part on the error status for the set of data.

Aspect 14: The method, apparatus, or non-transitory computer-readable medium of aspect 13, where the metadata information is a single metadata bit.

Aspect 15: The method, apparatus, or non-transitory computer-readable medium of any of aspects 13 through 14, where the metadata information includes multiple metadata bits.

Aspect 16: The method, apparatus, or non-transitory computer-readable medium of any of aspects 13 through 15, where the set of data is determined to be error-free and the method, apparatuses, and non-transitory computer-readable medium further includes operations, features, circuitry, logic, means, or instructions, or any combination thereof for sending the set of data, along with the metadata information, to a host system.

Aspect 17: The method, apparatus, or non-transitory computer-readable medium of any of aspects 13 through 16, where the set of data is determined to have a correctable error and the method, apparatuses, and non-transitory computer-readable medium further includes operations, features, circuitry, logic, means, or instructions, or any combination thereof for correcting the set of data based at least in part on the set of data having a correctable error and sending the corrected set of data, along with an indication of the metadata information, to a host system.

Aspect 18: The method, apparatus, or non-transitory computer-readable medium of any of aspects 13 through 17, where the ECC decoding operation is performed on a first set of parity bits and a second set of parity bits for the set of data and the method, apparatuses, and non-transitory computer-readable medium further includes operations, features, circuitry, logic, means, or instructions, or any combination thereof for comparing the first set of parity bits and the second set of parity bits based at least in part on determining that the set of data has an uncorrectable error, where the metadata information is recovered, and an updated error status for the set of data is determined, based at least in part on the comparison.

Aspect 19: The method, apparatus, or non-transitory computer-readable medium of aspect 18, further including operations, features, circuitry, logic, means, or instructions, or any combination thereof for determining, based at least in part on the comparison, that the first set of parity bits is inverted relative to the second set of parity bits, where the metadata information is recovered, and the set of data is determined to be error-free, based at least in part on the first set of parity bits being inverted relative to the second set of parity bits.

Aspect 20: The method, apparatus, or non-transitory computer-readable medium of any of aspects 18 through 19, further including operations, features, circuitry, logic, means, or instructions, or any combination thereof for determining, based at least in part on the comparison, that the first set of parity bits includes a threshold quantity of bits that match the second set of parity bits, where the metadata information is recovered, and the set of data is determined to have a correctable error, based at least in part on the first set of parity bits including a threshold quantity of bits that match the second set of parity bits.

Aspect 21: The method, apparatus, or non-transitory computer-readable medium of any of aspects 13 through 20, where the ECC decoding operation is performed on a first set of parity bits and a second set of parity bits for the set of data and the method, apparatuses, and non-transitory computer-readable medium further includes operations, features, circuitry, logic, means, or instructions, or any combination thereof for inverting the first set of parity bits before storing the first set of parity bits in the memory device and based at least in part on the metadata information, where the ECC decoding operation is performed after reading the first set of parity bits from the memory device.

It should be noted that the aspects described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 22: A memory device, including: a memory array; and an error correction code (ECC) circuit coupled with the memory array, where the memory device is configured to: perform, by the ECC circuit, an ECC decoding operation on a first set of parity bits for a set of data and a second set of parity bits for the set of data; compare, based at least in part on the ECC decoding operation indicating that the set of data has an uncorrectable error, the first set of parity bits to the second set of parity bits; and recover metadata information, for the set of data, previously received by the memory device, based at least in part on the comparison.

Aspect 23: The memory device of aspect 22, where the memory device is further configured to: determine an updated error status for the set of data based at least in part on the comparison.

Aspect 24: The memory device of aspect 23, where the memory device is further configured to: determine, based at least in part on the comparison, that the first set of parity bits do not match the second set of parity bits, where the metadata information is recovered, and the set of data is determined to be error-free, based at least in part on the determination.

Aspect 25: The memory device of any of aspects 23 through 24, where the memory device is further configured to: determine, based at least in part on the comparison, that the first set of parity bits includes a threshold quantity of bits that do not match the second set of parity bits, where the metadata information is recovered, and the set of data is determined to have a correctable error, based at least in part on the determination.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

A switching component (e.g., a transistor) discussed herein may be a field-effect transistor (FET), and may include a source (e.g., a source terminal), a drain (e.g., a drain terminal), a channel between the source and drain, and a gate (e.g., a gate terminal). A conductivity of the channel may be controlled (e.g., modulated) by applying a voltage to the gate which, in some examples, may result in the channel becoming conductive. A switching component may be an example of an n-type FET or a p-type FET.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processor. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, that can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or a processor.

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

performing, by a memory device, an error correction code (ECC) decoding operation on a first set of parity bits for a set of data and a second set of parity bits for the set of data; and recovering metadata information previously received by the memory device, for the set of data, based at least in part on the ECC decoding operation, wherein one or more second values recovered for the metadata information, when the ECC decoding operation indicates the set of data is associated with an uncorrectable error, are different from one or more first values recovered for the metadata information when the ECC decoding operation indicates the set of data is error-free or indicates the set of data is associated with a correctable error.

2. The method of claim 1, further comprising:

performing, based at least in part on the ECC decoding operation indicating that the set of data is associated with the uncorrectable error, a comparison of the first set of parity bits and the second set of parity bits; and determining an updated error status for the set of data based at least in part on the comparison.

3. The method of claim 2, further comprising:

determining, based at least in part on the comparison, that the first set of parity bits do not match the second set of parity bits, wherein the metadata information is recovered, and the set of data is determined to be error-free, based at least in part on the determination.

4. The method of claim 2, further comprising:

determining, based at least in part on the comparison, that the first set of parity bits comprises a threshold quantity of bits that do not match the second set of parity bits, wherein the metadata information is recovered, and the set of data is determined to have the correctable error, based at least in part on the determination.

5. The method of claim 2, wherein comparing the first set of parity bits to the second set of parity bits comprises:

performing a bitwise XOR operation on the first set of parity bits and the second set of parity bits.

6. The method of claim 5, further comprising:

determining a quantity of bits in a set of output bits, from the bitwise XOR operation, that are a first logic value, wherein the metadata information is recovered based at least in part on the quantity of bits.

7. The method of claim 6, further comprising:

comparing the quantity of bits to a threshold quantity, wherein the metadata information is recovered based at least in part on comparing the quantity of bits to the threshold quantity.

8. The method of claim 1, wherein the metadata information is a single metadata bit.

9. The method of claim 2, further comprising:

determining, based at least in part on the comparison, that the first set of parity bits is completely inverted relative to the second set of parity bits, wherein the metadata information is recovered based at least in part on determining that the first set of parity bits is completely inverted relative to the second set of parity bits.

10. The method of claim 2, further comprising:

determining, based at least in part on the comparison, that the first set of parity bits comprises a threshold quantity of bits that match the second set of parity bits, wherein the metadata information is recovered based at least in part on determining that the first set of parity bits comprises the threshold quantity of bits that match the second set of parity bits.

11. The method of claim 1, further comprising:

inverting, based at least in part on the metadata information, the first set of parity bits before storing the first set of parity bits in the memory device; and reading the first set of parity bits from the memory device after storing the first set of parity bits in the memory device, wherein the ECC decoding operation is performed based at least in part on reading the first set of parity bits.

12. The method of claim 11, further comprising:

generating, after reading the set of data, the second set of parity bits based at least in part on the set of data.

13. A method, comprising:

performing, by a memory device, an error correction code (ECC) decoding operation for a set of data; and recovering metadata information for the set of data, the metadata information previously received by the memory device, based at least in part on the ECC decoding operation, wherein one or more second values recovered for the metadata information, when the ECC decoding operation indicates the set of data is associated with an uncorrectable error, are different from one or more first values recovered for the metadata information when the ECC decoding operation indicates the set of data is error-free or indicates the set of data is associated with a correctable error.

14. The method of claim 13, wherein the metadata information is a single metadata bit.

15. The method of claim 13, wherein the metadata information comprises multiple metadata bits.

16. The method of claim 13, wherein the set of data is determined to be error-free, the method further comprising:

sending the set of data, along with the metadata information, to a host system.

17. The method of claim 13, wherein the set of data is determined to have the correctable error, the method further comprising:

correcting the set of data based at least in part on the set of data having the correctable error; and sending the corrected set of data, along with an indication of the metadata information, to a host system.

18. The method of claim 13, wherein the ECC decoding operation is performed on a first set of parity bits and a second set of parity bits for the set of data, and wherein the ECC decoding operation indicates that the set of data has the uncorrectable error, the method further comprising:

comparing the first set of parity bits and the second set of parity bits based at least in part on determining that the set of data has the uncorrectable error, wherein the metadata information is recovered, and an updated error status for the set of data is determined, based at least in part on the comparison.

19. The method of claim 18, further comprising:

determining, based at least in part on the comparison, that the first set of parity bits is completely inverted relative to the second set of parity bits, wherein the metadata information is recovered, and the set of data is determined to be error-free, based at least in part on the first set of parity bits being inverted relative to the second set of parity bits.

20. The method of claim 18, further comprising:

determining, based at least in part on the comparison, that the first set of parity bits comprises a threshold quantity of bits that match the second set of parity bits, wherein the metadata information is recovered, and the set of data is determined to have the correctable error, based at least in part on the first set of parity bits comprising the threshold quantity of bits that match the second set of parity bits.

21. The method of claim 13, wherein the ECC decoding operation is performed on a first set of parity bits and a second set of parity bits for the set of data, the method further comprising:

inverting the first set of parity bits before storing the first set of parity bits in the memory device and based at least in part on the metadata information, wherein the ECC decoding operation is performed after reading the first set of parity bits from the memory device.

22. A memory device, comprising:

a memory array; and an error correction code (ECC) circuit coupled with the memory array, wherein the memory device is configured to:

perform, by the ECC circuit, an ECC decoding operation on a first set of parity bits for a set of data and a second set of parity bits for the set of data; and recover metadata information previously received by the memory device, for the set of data, based at least in part on the ECC decoding operation, wherein one or more second values recovered for the metadata information, when the ECC decoding operation indicates the set of data is associated with an uncorrectable error, are different from one or more first values recovered for the metadata information when the ECC decoding operation indicates the set of data is error-free or indicates the set of data is associated with a correctable error.

23. The memory device of claim 22, wherein the memory device is further configured to:

perform, based at least in part on the ECC decoding operation indicating that the set of data is associated with the uncorrectable error, a comparison of the first set of parity bits and the second set of parity bits; and determine an updated error status for the set of data based at least in part on the comparison.

24. The memory device of claim 23, wherein the memory device is further configured to:

determine, based at least in part on the comparison, that the first set of parity bits do not match the second set of parity bits, wherein the metadata information is recovered, and the set of data is determined to be error-free, based at least in part on the determination.

25. The memory device of claim 23, wherein the memory device is further configured to:

determine, based at least in part on the comparison, that the first set of parity bits comprises a threshold quantity of bits that do not match the second set of parity bits, wherein the metadata information is recovered, and the set of data is determined to have the correctable error, based at least in part on the determination.

* * * * *